Figure 1:
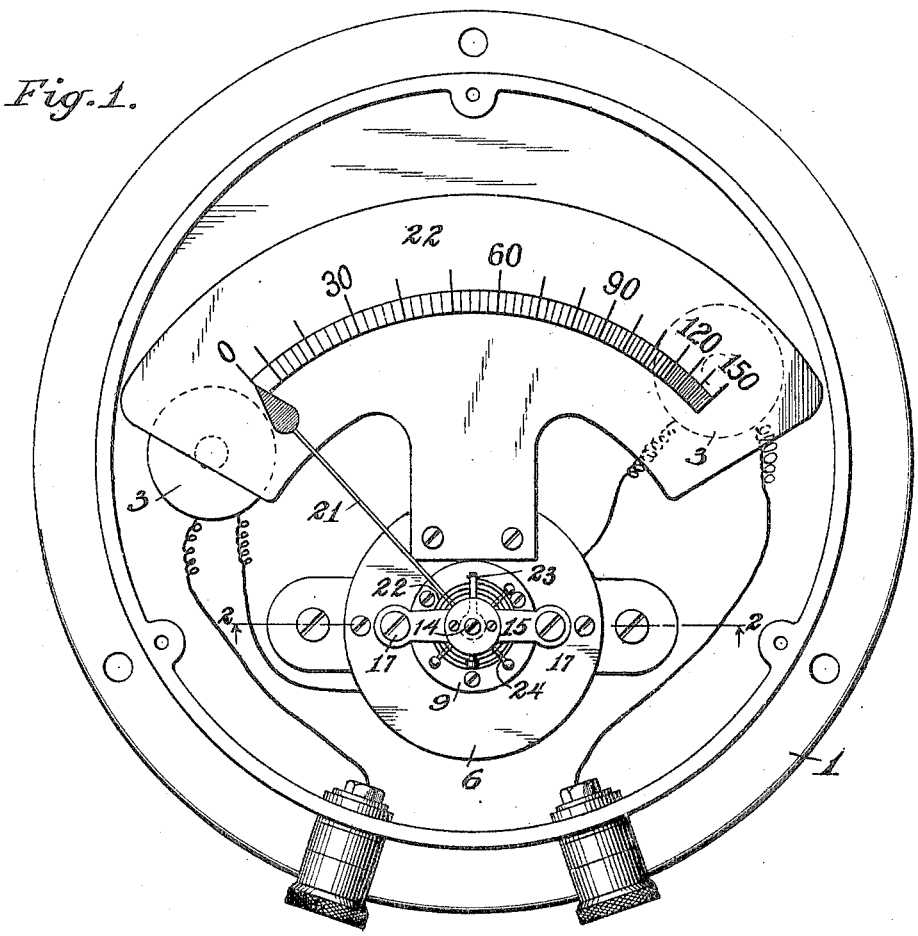

No. 811,956. PATENTED FEB. 6, 1906.
M. C. RYPINSKI.
ELECTRICAL MEASURING INSTRUMENT.
APPLICATION FILED MAR. 15, 1905.

2 SHEETS—SHEET 1.

WITNESSES:
Grace L. Heasley.
May S. Avery.

INVENTOR
Maurice C. Rypinski
BY
Charles D. Jones.
His ATTORNEY

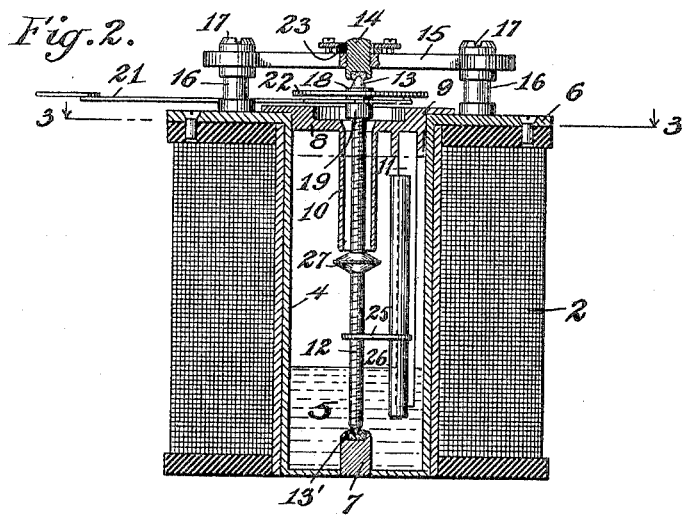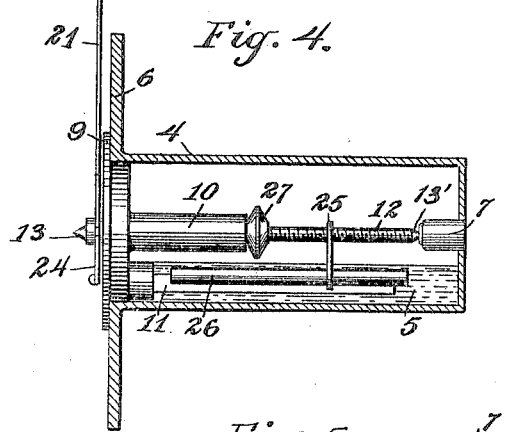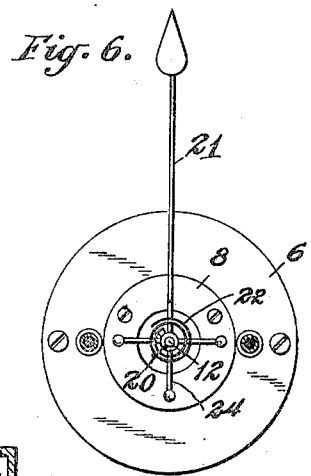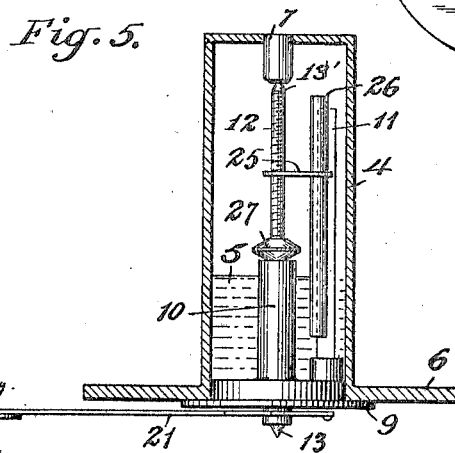

UNITED STATES PATENT OFFICE.

MAURICE C. RYPINSKI, OF NEW YORK, N. Y.

ELECTRICAL MEASURING INSTRUMENT.

No. 811,956.  Specification of Letters Patent.  Patented Feb. 6, 1906.

Application filed March 15, 1905. Serial No. 250,182.

*To all whom it may concern:*

Be it known that I, MAURICE C. RYPINSKI, a citizen of the United States, and a resident of the borough of Manhattan, city and State of New York, have invented certain new and useful Improvements in Electrical Measuring Instruments, of which the following is a specification.

My invention relates to electrical measuring instruments, the object being to construct a cheap and efficient instrument of the induction type—that is, one in which no current flows in the moving element, but produces effects by its induced action in the latter, although many features of the invention are applicable to other types of measuring instruments.

A further object is to overcome existing defects in oil-damped instruments.

Heretofore various means have been devised to render the needle of an electrical measuring instrument dead beat. These include means which utilize the retarding action of eddy-currents generated in conducting masses moving in magnetic fields or the retarding action of a body of air or oil. Damping by oil presents many advantages, but as carried out in practice involves a complicated system of levers to connect the moving system with an oil-receptacle remotely situated in the instrument-case. Moreover, in a cold temperature the oil tends to thicken, thus interfering with the proper movement of the needle. Another and one of the main objections to oil-damped instruments as at present constructed is that the oil must be removed from its receptacle for transportation of the instrument and subsequently replaced upon installation by the user. This in addition to being inconvenient renders damage to the instrument liable through negligence or ignorance when the parts are reassembled.

I overcome the above defects by constructing a unitary moving system and support the same in an oil-receptacle located within the core of the stationary field-coil of the instrument in such manner that the oil acts directly against the rotating members of said system and without the necessity of intervening connecting-levers. The body of oil is thus maintained within a zone of heat, thereby obviating all trouble due to freezing. Additionally the oil-receptacle is provided with means by which the oil may be retained therein during transportation, such means comprising a cap which prevents the oil from escaping no matter in what position the instrument may be.

The above and other features of the invention will be understood by reference to the accompanying drawings, in which—

Figure 3:
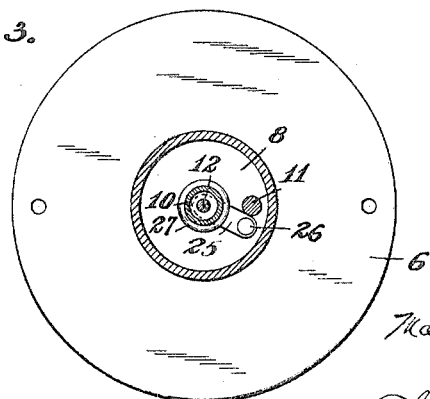

Figure 1 is a face view of my instrument with the cover removed. Fig. 2 is a longitudinal sectional view on the plane of the line 2 2 of Fig. 1. Fig. 3 is a transverse sectional view on the plane of the line 3 3 of Fig. 2. Figs. 4 and 5 are similar views of the oil-receptacle and moving system, the former when the instrument is hung vertically and the latter when in an inverted horizontal position; and Fig. 6 is a detail face view with certain of the parts removed.

Similar reference-numerals indicate similar parts in the several views.

The invention is applicable to electrical measuring instruments of various kinds; but for convenience of description and illustration it is shown in connection with a volt-meter, in which the numeral 1 designates a metal case of switchboard pattern, the particular form shown being intended for use with the instrument hanging vertically.

2 designates a stationary field-coil or helix mounted with its axis which is parallel to the axis of the case, and 3 3 designate the series resistance for the field-coil. The winding of the field-coil will vary with the character of the measurement to be made by the instrument. If the invention is applied to an ammeter, there will be no series resistance and the field-coil of fine wire will be replaced by one of coarser wire, the remaining parts of the instrument remaining unchanged.

The parts above referred to are such as found in existing instruments and require no further description.

In order to overcome defects incident to prior instruments, I provide a cup 4, usually of brass, adapted to sit snugly in the core of the stationary field-coil and which is about one-third filled with a damping fluid 5, preferably a mixture of sperm and engine oil of the proper density to give the right damping action. The cup 4 is formed with or has secured thereto an annular flange 6, adapted to rest upon and to be secured, by means of screws, to the frame of the field-coil, as clearly shown in Fig. 2. In the center of the bottom of cup 4 is fixed a jeweled bearing 7, which serves to support the lower pivoted end of the moving system. Fitting within the outer open end of cup 4 is a cap 8, the body portion of which is provided with a flange 9, which rests upon and is secured to the flange 6. The body portion of the cap is formed with a central opening from which extends the brass tube 10, the axis of said tube coinciding with the axis of cup 4. The cup 4 and its flange 6 may be made of a single piece of metal, and the parts 8, 9, and 10, constituting the cap, may also be made of a single piece of metal. If made of separate pieces, the joints are made oil-tight, and the junction of the cup and cap is secured with an oil-proof compound, preferably shellac. To the under side of the cap 8 is secured a rod 11 of about one-eighth of an inch in diameter, made of well-annealed high-grade steel and constituting the stationary magnetic member of the system hereinafter described. The axis of the rod 11 is parallel with the axis of the tube 10.

The moving system comprises a small brass shaft 12, threaded over its entire length and having inserted in its ends small steel pivots 13 and 13'. Said shaft passes centrally through the tube 10, one end being seated in the bearing 7 and the other end in a jewel-bearing 14, which latter bearing is secured to a bridge-piece 15, mounted on posts 16 upon the flange 6. The bridge 15 is secured in position by set-screws 17, by means of which said bridge and the bearing 14 may be removed to permit access to and the removal of the moving system. Near the outer end of shaft 12 are two collars 18 and 19, between which is clamped a disk 20, (see Fig. 6,) having integral therewith an indicating-needle 21, adapted to move over a scale-plate 22, said plate being secured by screws to the flange 6. A coiled spring 22 is attached at one end to the disk 20 and at the other to an arm 23, formed with an eye to engage the bearing 14. The disk 20 has also integral therewith three arms 24, which serve as a counterbalance for the indicating-needle.

Radially secured to the shaft 12 is a short arm 25, which carries at its outer end a magnetic member 26, made similar to the member 11, these two members being parallel and also adjacent when the instrument is on zero. The needle 21 is mounted diametrically opposite to the magnetic member 26, the one serving in a measure to counterbalance the other, although in order to effect a perfect balance I employ the three arms 24, above referred to. Threaded on the shaft 12 is a round nut 27, placed immediately below the inner open end of the tube 10, but not closing said tube. The upper and lower sides of the nut 27 are chamfered down, as shown in the drawings, the function of said nut being to deflect any oil which may become attached to the shaft 12 and prevent it traveling down said shaft through the opening in the cap when the instrument is laid horizontally or inverted.

The operation of the instrument is as follows: Current flowing through the field-coil 2 induces magnetic poles of like sign adjacent to each other in the magnetic members 26 and 11. This gives rise to a repellent force between said members, and the member 26 being free to move carries its system around to a point where the retarding torque of the controlling-spring 22 just balances the repellent force due to the magnetic field. The needle is thoroughly damped and will move to its final deflection without oscillation by the movement of the member 26 through the body of oil 5.

From the above description it will be seen that the moving system is comprised within a unitary structure in which the damping effect of the oil is exerted directly upon the rotating member of said system, thereby greatly simplifying and rendering the instrument more efficient. In whatever position the instrument may be the nut 27 prevents the escape of oil through the tube 10. The body of oil is not sufficient to close the inner end of tube 10 when the instrument is laid horizontally, and any oil which might become attached to the shaft 12 will be deflected upon reaching the nut 27 whenever the instrument is moved to a vertical position, so that the oil-receptacle will lie horizontally, as in Fig. 4, or whenever inverted, as in Fig. 5. This feature of the invention is of prime importance, in that the oil may be introduced and the instrument completely assembled and adjusted, transported without fear of the escape of oil, and ready for immediate use upon delivery, thus obviating all necessity for special transportation devices and the reassemblage of the parts. The shaft 12 of the moving system passes freely through the cap of the oil-receptacle and has no frictional engaging surfaces other than the jewel-bearings 7 and 14, yet the simple means above described prevents any escape of oil through the opening in said cap. The entire moving system may be readily taken out by removing the bridge 15 and detaching the cap of the oil-receptacle. By placing the damping fluid within the stationary magnetic field it not only acts directly on the members of the moving system, but by reason of the conduction of heat from the stationary field the damping fluid is prevented from freezing.

What I claim, and desire to secure by Letters Patent, is—

1. In an electrical measuring instrument the combination of a stationary coil, a receptacle containing a damping fluid supported within said coil, a moving system comprising magnetic members suspended within said receptacle, and an indicating-needle supported exteriorly of the receptacle.

2. In an electrical measuring instrument the combination of a stationary coil, a removable receptacle containing a damping fluid supported within said coil, and a moving system supported within said receptacle.

3. In an electrical measuring instrument the combination of a stationary coil, a removable receptacle containing a damping fluid supported within said coil, a moving system supported within said receptacle, and means to prevent the escape of said fluid from said receptacle in whatever position the instrument may be placed.

4. In an electrical measuring instrument the combination of a stationary coil, a receptacle containing a damping fluid supported within said coil, an apertured cap closing one end of said receptacle, a moving system comprising a shaft passing through the cap-aperture and supported on a bearing in said receptacle, and means to prevent the escape of the damping fluid through said aperture.

5. In an electrical measuring instrument the combination of a stationary coil, a removable receptacle containing a damping fluid supported within said coil, a moving system supported within said receptacle, said system comprising a pivoted shaft having a magnetic member attached thereto.

6. In an electrical measuring instrument the combination of a stationary coil, a receptacle containing a damping fluid supported within said coil, an apertured cap closing one end of said receptacle, a moving system comprising a shaft passing through the cap-aperture, and a fluid-deflector secured to said shaft.

7. In an electrical measuring instrument the combination of a stationary coil, a removable receptacle containing a damping fluid supported within said coil, a moving system comprising a shaft, bearings for said shaft one of which is within said receptacle and the other carried by a frame supported on said receptacle.

8. In an electrical measuring instrument the combination of a stationary coil, a removable receptacle containing a damping fluid supported within said coil, a moving system supported within said receptacle, said system comprising a shaft having secured thereto a magnetic member and an indicating-needle, and a scale-plate secured to said receptacle.

9. In an electrical measuring instrument the combination of a stationary coil, a removable receptacle containing a damping fluid supported within said coil, a cap closing one end of said receptacle, a fixed magnetic member secured to said cap, and a moving magnetic member suspended in said receptacle and normally adjacent to said fixed member.

In testimony whereof I have hereunto signed my name in the presence of two subscribing witnesses.

MAURICE C. RYPINSKI.

Witnesses:
 GRACE L. HEASLEY,
 ALEXANDER S. RODMAN.